United States Patent
Ma (10) Patent No.: US 10,776,214 B1
(45) Date of Patent: Sep. 15, 2020

(54) SYSTEM PROTECTING DATA STORED ON NVDIMM DEVICES AFTER BIOS UPDATE

(71) Applicant: QUANTA COMPUTER INC., Taoyuan OT (TW)

(72) Inventor: Chun-Po Ma, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 85 days.

(21) Appl. No.: 16/291,851

(22) Filed: Mar. 4, 2019

(51) Int. Cl.
| | |
|---|---|
| *G06F 12/00* | (2006.01) |
| *G06F 11/14* | (2006.01) |
| *G06F 9/4401* | (2018.01) |
| *G06F 8/65* | (2018.01) |
| *G06F 11/22* | (2006.01) |

(52) U.S. Cl.
CPC .......... *G06F 11/1456* (2013.01); *G06F 8/65* (2013.01); *G06F 9/4401* (2013.01); *G06F 11/2284* (2013.01)

(58) Field of Classification Search
CPC .......... G06F 11/1446; G06F 11/1448; G06F 11/1458; G06F 11/1471; G06F 11/2069; G06F 11/2084; G06F 11/1456
See application file for complete search history.

(56) References Cited

U.S. PATENT DOCUMENTS

2015/0378841 A1* 12/2015 Jayakumar ............ G06F 9/4401
714/6.12

* cited by examiner

*Primary Examiner* — Sean D Rossiter
(74) *Attorney, Agent, or Firm* — Nixon Peabody LLP (57) ABSTRACT

A system and method for protecting desired data in a non-volatile dual in line memory module (NVDIMM) in a computer system. The system includes a basic input output system (BIOS). The non-volatile dual in line memory module (NVDIMM) is coupled to a memory bus. The NVDIMM includes a non-persistent memory and a persistent memory. A processor is coupled to the memory bus. When an update is applied to the basic input output system, desired data stored in the persistent memory of the NVDIMM is protected by disabling a NVDIMM backup function after a first power cycle immediately after the BIOS update. The backup function is enabled to restore the desired data to the non-persistent memory of NVDIMM from persistent memory after a second power cycle.

19 Claims, 4 Drawing Sheets

SYSTEM PROTECTING DATA STORED ON NVDIMM DEVICES AFTER BIOS UPDATE

TECHNICAL FIELD

The present disclosure relates generally to memory protection for computing devices. More particularly, aspects of this disclosure relate to a system that prevents undesired memory backup for a non-volatile dual in-line memory module (NVDIMM) after a BIOS update.

BACKGROUND

Computer devices typically include both volatile and non-volatile memory for storing data required to operate such devices. Traditional non-volatile memory, such as hard disk drives, retains stored data even when power is turned off to the memory. Thus, non-volatile memory retains its stored data content even when electrical power is removed, for example from an unexpected power loss, system crash, or normal shutdown of the computer system. The disadvantage with traditional non-volatile memory devices is access to stored data is relatively slow. In contrast, access times to data on volatile memory are fast, but such memory requires continuous power to retain data stored in such devices. Traditional volatile memory is dynamic random access memory (DRAM).

Recently, non-volatile dual in-line memory module (NVDIMM) devices have been used to leverage the speed of volatile memory, and the power independence from volatile memory. Thus, NVDIMM may be used as a type of random-access memory for computer devices such as a server. The term "dual in-line" identifies the memory as using the dual in-line memory module package similar to a dynamic random access memory (DRAM). The NVDIMM can thus use the high speed of a DRAM bus and provides quick memory accesses by components such as a processor in a computer device. A NVDIMM uses a standard DIMM type DRAM to generally store data. The NVDIMM also includes a flash memory. When power to the NVDIMM is cut off, the contents of the DRAM are copied to the flash memory. A microcontroller in the NVDIMM supervises the movement of the data from the DRAM to the flash memory when power is lost. The microcontroller also restores the backup data stored on the flash memory back into the DRAM of the NVDIMM when power is restored.

The flash memory feature for NVDIMMs allows data to be preserved in the event of an AC power supply failure as well as situations such as a system graceful shut down, a system power cycle, a CPU overheat, a platform controller hub (PCH) overheat and a system power overheat.

NVDIMMs improve application performance, data security, and system crash recovery time because data may simply be reloaded from the flash memory internal to the NVDIMM without having to retrieve the data from another source. This bypasses the need for additional access times for data from another source. Thus, NVDIMMs enhance reliability and endurance for devices such as solid-state drives (SSD).

One circumstance that occurs periodically is an update of the basic input output system (BIOS) of a computer device. The BIOS functions to boot up a computer device before loading the operating system. The BIOS also functions to manage data flow between processors and memory devices, such as NVDIMMs. The BIOS is usually fixed instructions, but periodically such instructions are updated to increase efficiency or correct firmware bugs.

However, the backup and restore functions to the flash memory of a NVDIMM leads to desired preserved data on the NVDIMM to be broken after such a BIOS update. Breaking preserved data on the NVDIMM occurs because the system will perform a power cycle to apply related setting changes after a BIOS update. The NVDIMM backup routine will write unknown data to the backup flash memory due to the power cycle routine being triggered. This backup procedure will thus overwrite the original desired data on the flash memory of the NVDIMM. This results in loss of the desired data and impedes proper functioning of the computer device because needed data is no longer stored on the NVDIMM.

When a BIOS update occurs, the NVDIMM backup mechanism will be triggered for preserving desired data stored on the NVDIMM DRAM to the flash memory because a power cycle is necessary. Thus, similar to circumstances such as an AC power loss, a graceful shutdown, or a system power cycle, the desired data is stored in the flash memory of the NVDIMM. However, after a BIOS update, the system will perform an additional timed power cycle to apply the related setting changes before memory initialization. When the system performs this power cycle, the NVDIMM is triggered to backup the unknown data on the DRAM to the flash memory. At that time, the original desired data on the flash drive will be overwritten by the unknown data currently stored on the DRAM. Thus, after the system power cycles again, the desired data is no longer available when the unknown data now stored on the flash memory is restored to the DRAM of the NVDIMM.

Figure 1:
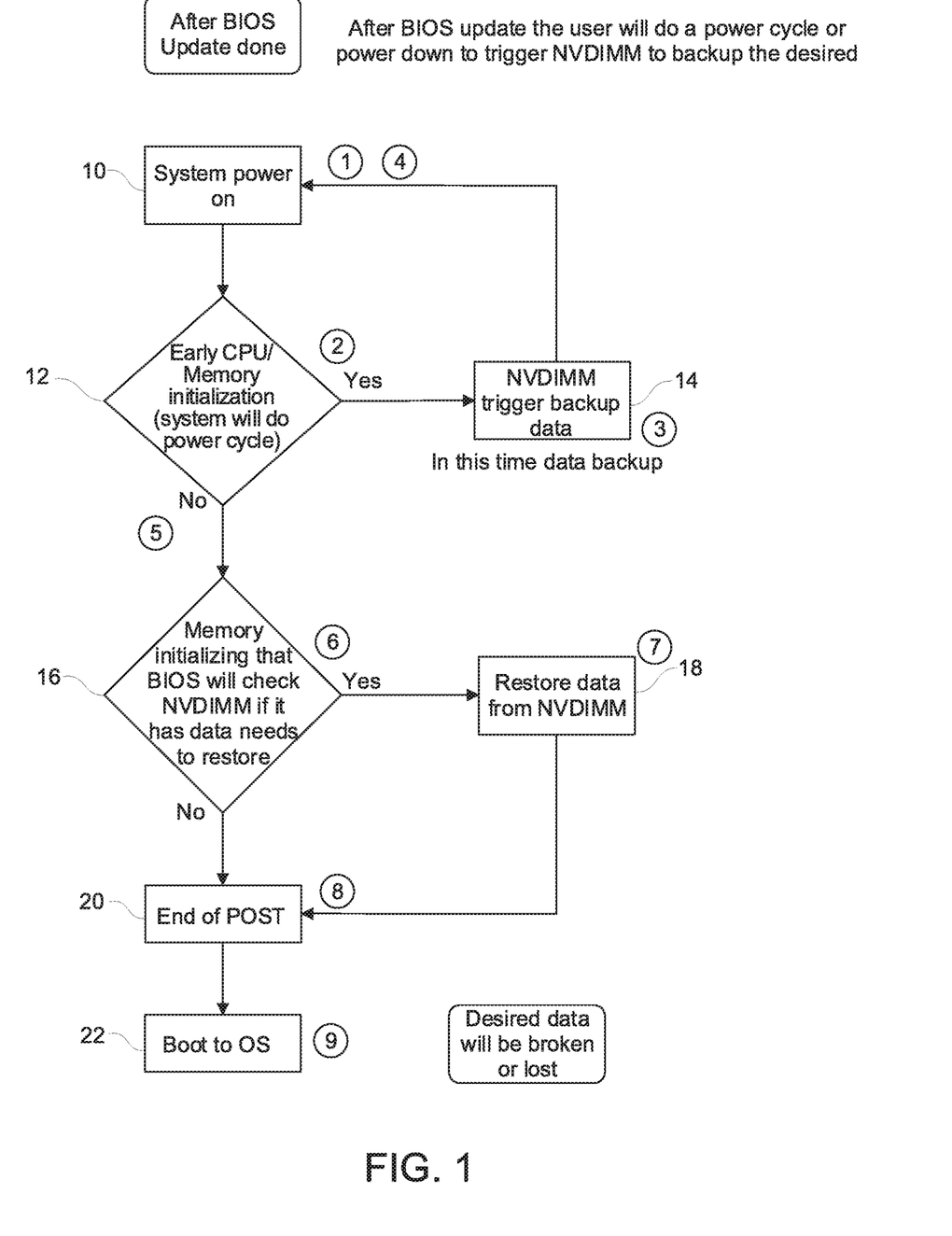
FIG. 1 is a flow chart of a prior art power up routine after a BIOS update that results in breaking desired data in a non-volatile dual in line memory module (NVDIMM)

FIG. 1 shows a flow chart of a prior art power up routine applied after a BIOS updated is applied. FIG. 1 illustrates the problem of losing, or breaking, desired data stored on a NVDIMM when a BIOS update is applied to a known computer system. After a BIOS update is installed, the system will perform a power cycle to apply related setting changes. The power cycle results in the NVDIMM backing up the desired data in the DRAM in the flash memory prior to power down. The system is then powered down.

In order to apply the settings related to the BIOS updates, the system power is turned on again (10). The system will then determine whether a power cycle must be performed to apply platform related settings before memory initialization (12). If a power cycle is required to apply the platform related settings, the system will thus trigger the NVDIMM to copy the data in the DRAM to the flash memory (14). At this time, the unknown data now stored in the DRAM will overwrite the desired data on the flash memory of the NVDIMM. The routine then loops back to turn on system power (10). At this time, the platform related settings are applied (12), and thus a power cycle does not have to be performed and thus the routine proceeds to step 16 to start memory initialization.

The BIOS checks the NVDIMM to determine if data needs to be restored (16). If data needs to be restored, the system will wait for the BIOS to initiate data restore in the NVDIMM by copying the backup data from the flash memory to the DRAM (18). The desired data has therefore been broken since the desired data originally in the flash memory is replaced by unknown data in the DRAM prior to the power cycle. This unknown data is thus restored to the DRAM in the NVDIMM.

Once the data is restored from the flash memory, or if the data does not need to be restored, the system will complete the power on self-test routine (20). The system will continue to boot to the operating system (22). As may be seen in FIG. 1, desired data on the NVDIMM DRAM will be broken or lost because of the extra power up cycle, required by the BIOS update, causes the desired data to be replaced with unknown data. The desired data is thus not available to the system.

There is a need for a system that avoids triggering a NVDIMM to backup and restore unknown data after a BIOS update. There is a further need for a solution to disable the NVDIMM backup function prior to a system boot to prevent broken desired data. There is a further need for a routine to properly backup desired data during a power cycle after a BIOS update.

SUMMARY

One disclosed example is a system for protecting desired data in a non-volatile dual in line memory module (NVDIMM) in a computer system. The system includes a basic input output system (BIOS). The non-volatile dual in line memory module (NVDIMM) is coupled to a memory bus. The NVDIMM includes a non-persistent memory and a persistent memory. A processor is coupled to the memory bus. When an update is applied to the basic input output system, desired data stored in the persistent memory of the NVDIMM is protected by disabling a NVDIMM backup function after a first power cycle immediately after the BIOS update. The backup function is enabled to restore the desired data to the non-persistent memory of NVDIMM from persistent memory after a second power cycle after the BIOS update.

Another disclosed example is a method of protecting desired data in a non-volatile in line memory module (NVDIMM) in a computer system. An update is installed to the computer system. Desired data in a non-persistent memory of the NVDIMM is copied to a persistent memory of the NVDIMM. The backup function of the NVDIMM is disabled during a first power cycle immediately after the update. The computer system is repowered after setting a related change to the update of the computer system. The backup function of the NVDIMM is enabled. A power on self-test routine is performed. The backup desired data from the persistent memory is restored to the non-persistent memory of the NVDIMM.

Another disclosed example is a system that protects desired data in a non-volatile dual in line memory module (NVDIMM). The system includes a non-volatile dual in line memory module (NVDIMM) coupled to a memory bus. The NVDIMM includes a non-persistent memory and a persistent memory, A processor is coupled to the memory bus. When an update is applied to the system that requires a power cycle, desired data stored in the persistent memory of the NVDIMM is protected. The desired data is protected by disabling a NVDIMM backup function after a first power cycle immediately after the update. The NVDIMM backup function is enabled to restore the desired data to the non-persistent memory of NVDIMM from persistent memory after a second power cycle after the update.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure provides a mechanism that protects desired data by bypassing the NVDIMM backup function that overwrites desired data in the backup flash memory after any update to the system, such as a BIOS update, that requires a power cycle to implement the update. In this situation, desired data is stored as backup data in the flash memory of the NVDIMM prior to the power down of the system. The routine avoids triggering the NVDIMM to backup unknown data from the DRAM to replace the desired data on the flash memory. The routine does so by disabling the NVDIMM backup function during the initial power cycle stages. The routine will restore the desired data from the flash memory after the initial power cycle stages, and right before the completion of the POST routine. This insures that the desired data is protected and therefore may be restored to the NVDIMM for use by the system.

Figure 2:
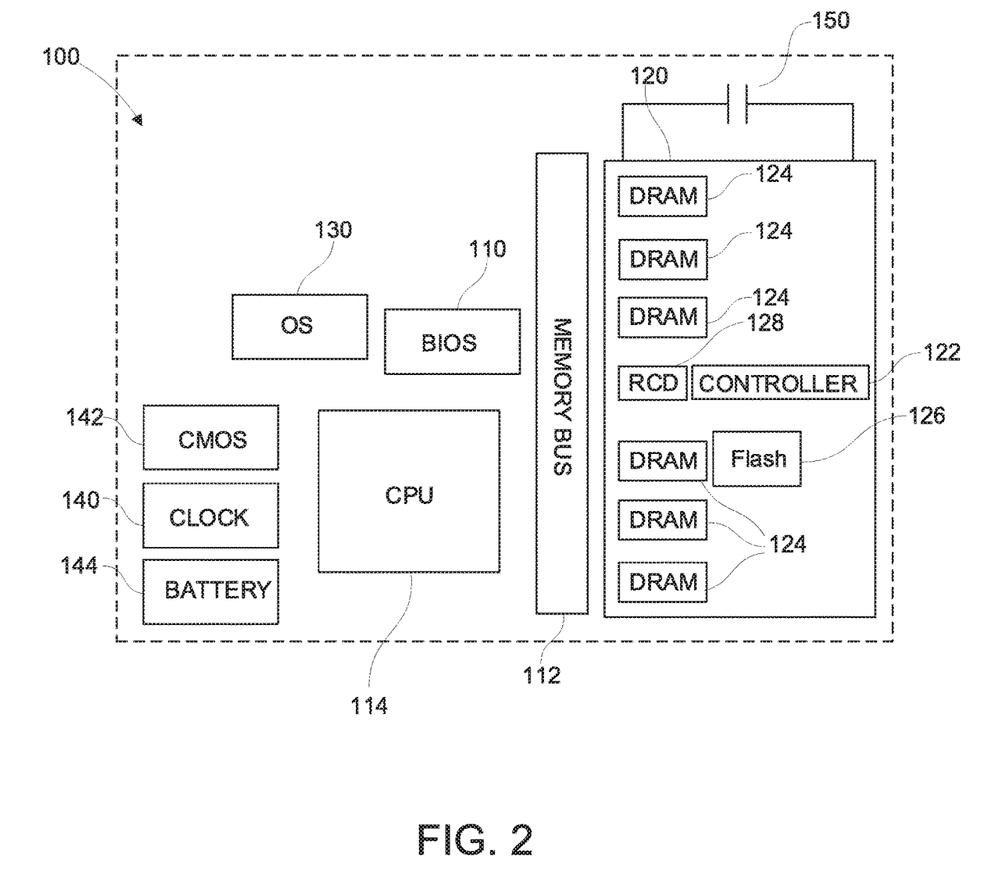
FIG. 2 is a block diagram of a server operating system including a backup routine that bypasses NVDIMM backup when a BIOS is updated.

FIG. 2 is a block diagram of an example computer system 100. The computer system 100 includes a basic input output system (BIOS) 110 that boots up the computer system and manages data flow. The computer system 100 includes a NVDIMM 120 that is connected to a memory bus 112. A processor 114 executes instructions such as those in the BIOS 110 and accesses data stored in the NVDIMM 120 via the memory bus 112. The NVDIMM 120 includes a controller 122, a set of non-persistent memories such as DRAMs 124, a backup persistent memory such as a flash memory 126, and a registered clock driver (RCD) 128. The DRAMs 124 are powered by a persistent power rail from the system 100 and thus stored data is erased when power is cutoff to the system 100. In this example, the flash memory 126 is NAND type flash memory, but any persistent flash memory may be used. In this example, the controller 122 may be any suitable controller, such as a field programmable gate array (FPGA), that provides flash memory control and high speed direct memory access to the DRAMs 124. The registered clock driver 128 buffers and retimes command, address, and clock signals from the processor 114. This reduces signal loading on the controller 122 by isolating the DRAMs 124.

The BIOS 110 interfaces with an operating system 130 that is booted up by the BIOS 110 in the power up routine for the processor 114. The start up mechanism for the system 100 include a real time clock 140 and a CMOS static memory 142. The real time clock 140 is attached to the processor 114. A capacitor 150 is coupled to the NVDIMM 120 to provide power for the backup of data from the DRAMs 124 to the flash memory 126 when power is interrupted to the system 100.

The CMOS memory 142 is a tiny bit of very low power static memory that is generally on the same chip as the real-time clock 140. In this example, the CMOS 142 (and the real time clock 140) can only be accessed through IO ports of the processor 114. The function of the CMOS 142 is to store a number of bytes of setup information for the BIOS 110 while the system 100 is turned off. In this example, the CMOS memory 142 is used to store an indicator whether to enable or disable the backup routine for the NVDIMM 120. A separate battery 144 is connected to the real time clock 140 and the CMOS 142. The battery 144 allows the real time clock 140 to operate and the CMOS 142 to retain data when power to the system 100 is cutoff. It is to be understood that any persistent memory may be used to store an indicator to enable or disable the NVDIMM backup routine.

The example system 100 includes a routine to bypass the NVDIMM restore function after a BIOS update. The routine initially disables the NVDIMM backup and restore functions until the system 100 goes through to the end of the power on self-test (POST) routine and therefore protects desired data on the NVDIMM 120. Near the end of the POST routine, the system 100 will enable the NVDIMM backup restore function. Thus, the NVDIMM 120 restores the proper desired data from the flash memory 126 to the DRAM 124 for a normal boot of the operation system 130. This scheme thus avoids desired data stored on the NVDIMM 120 to be broken by an undesired backup and restore of unknown data on the DRAM 124 replacing desired data in the flash memory 126. The NVDIMM restore function is bypassed temporarily by disabling the NVDIMM restore function during the power cycle stage before booting the operating system 130. In this manner, the system 100 will avoid overwriting desired data to the flash memory 126 with unknown data and thus break the desired data when the unknown data is restored after the end of the POST routine.

After a BIOS update, the user will perform a power cycle or power down to trigger the NVDIMM 120 to backup the desired data currently stored on the DRAM to the flash memory 126. As previously explained, in prior art systems, the power cycle to implement the BIOS update will result in the desired data backed up in the flash memory 126 to be replaced by unknown data in the DRAM 124, thus breaking the desired data. In order to solve this problem, the system 100 includes a routine that bypasses this function during the initial power cycle, thus insuring the proper desired data is restored to the DRAM 124 of the NVDIMM 120.

Figure 3:
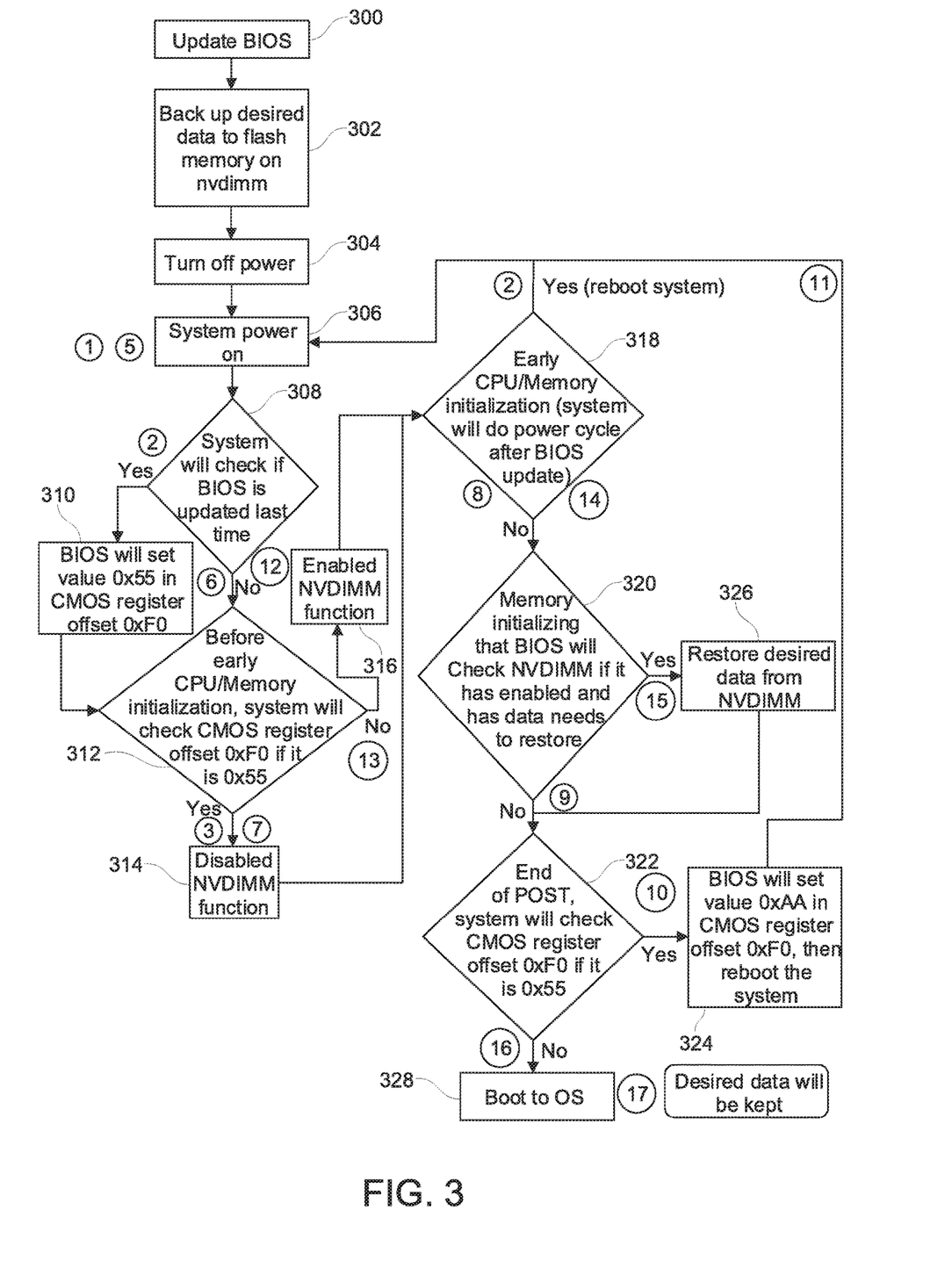
FIG. 3 is a flow diagram of the power on routine to prevent breaking data stored in the NVDIMM unit after a BIOS update.

The flow diagram in FIG. 3 is representative of example machine readable instructions for the bypass process to protect desired data stored on the NVDIMM 120 in FIG. 2. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 3 is a flow diagram of the routine by the system 100 in FIG. 2 to protect desired data after an update is performed on the BIOS 110. Initially, updates are applied to the BIOS 110 (300). The updates will trigger a power cycle to apply settings to support the BIOS updates and thus, the NVDIMM 120 will backup desired data currently stored in the DRAM 124 to the flash memory 126 (302). The system power is then turned off (304). At this point, desired data is stored in the flash memory 126 of the NVDIMM 120, since the power off erases data in the DRAM 124.

The system power is then turned on to initiate the power cycle (306). The system 100 will determine whether the BIOS 110 has been updated (308). In this example, if the BIOS 110 has been updated, the system 100 will set a value 0x55 in a register offset address 0xF0 of the CMOS 142 to signify disabling the NVDIMM backup function (310). Any suitable register in any separately powered and/or persistent memory and any suitable value may be used to signify disabling the NVDIMM backup function.

After setting the register offset value to 0x55 in the CMOS 142, the system 100 will check whether the register offset address 0xF0 of the CMOS 142 has the 0x55 value (312). This process occurs before early CPU and memory initialization. If the register offset address 0xF0 has the 0x55 value, the system 100 will disable the NVDIMM function that backs up data on the flash memory 126 (314). If the CMOS register offset address 0xF0 does not have the 0x55 value, the NVDIMM backup function is enabled (316).

Once the NVDIMM backup function is set as disabled, the routine determines whether early CPU and memory initialization is necessary (318). If the initialization is necessary (immediately after the BIOS is updated), the system 100 will loop back to perform a power cycle to reboot the system 100 (306). Since the NVDIMM backup function is disabled, the NVDIMM 120 will not backup data on the DRAM 124 to the flash memory 126 prior to the power cycle initiation, thus preserving the desired data on the flash memory 126.

The system 100 will then loop back and determine the BIOS 110 has not been updated since the last check (308). The system 100 will then determine the value 0x55 is set in the register offset address 0xF0 of the CMOS 142 (312). The system will then disable the NVDIMM backup memory function (314).

The system 100 then will determine that early memory and CPU initialization is not required (318). The BIOS 110 will check whether the NVDIMM backup function is enabled and thus the NVDIMM 120 has data in the flash memory 126 that needs to be restored (320). At this stage of the routine, the backup function has not been enabled, and the routine will proceed to the end of the POST routine. At the end of the POST routine, the system 100 will check the register offset address 0xF0 of the CMOS 142 to determine whether the value is 0x55 (322). If the register offset address 0xF0 of the CMOS 142 is set to 0x55, the BIOS 110 will set the value 0xAA in the register offset address 0xF0 of the CMOS 142 (324). The routine will then loop back and power cycle the system (306). Since the backup function is still disabled, the NVDIMM 120 will not copy the contents of the DRAM 124 into the flash memory 126 and therefore continue to protect the desired data stored in the flash memory 126.

After the power cycle (306), the system will check to see if the BIOS 110 is updated (308). At this stage, the BIOS 110 is not updated, and thus the routine proceeds to check whether the register offset address 0xF0 of the CMOS 142 is set to 0x55 (312). Since the register offset address 0xF0 is now set to 0xAA from step 324, the routine branches to step 316 to enable the backup function of the NVDIMM 120. The routine then proceeds to step 318 and determines that early memory and CPU initialization is not required.

The BIOS 110 then determines that the backup function is enabled and that data needs to be restored (320). The routine then restores the backup desired data from the flash memory 126 to the DRAM 124 of the NVDIMM 120 (326). The routine will then proceed with the POST routine. At the end of the POST routine, the system 100 will check the register offset address 0xF0 of the CMOS 142 to determine whether the value is 0x55 (322). At this stage, the register offset address 0xF0 of the CMOS 142 is set to 0xAA, and thus the routine proceeds to begin the boot of the operating system 130 (328). The desired data is therefore stored in the DRAM 124 of the NVDIMM 120 from the backup data in the flash memory 126.

As explained above, the routine in FIG. 3 allows the bypass of the NVDIMM backup function when the system initially powers up after an update is applied to the BIOS, thus preserving desired data during that stage. The use of the 0x55 value in the CMOS register offset disables the NVDIMM backup function during the initialization of the processor and memory when the BIOS is updated. Thus, any unknown data in the NVDIMM memory 120 will not be backed up and restored during the POST routine immediately after the BIOS update is applied. After the POST process, the system 100 will set a new value, 0xAA, in the register offset address 0xF0 of the CMOS 142 and reboot the system. Since the 0xF0 value is not set during this cycle, the NVDIMM backup function will be enabled. Thus, after the second initialization, the desired data from the flash memory 126 will be restored to the DRAMs 124 of the NVDIMM 120. The system 100 will then proceed to normally boot up the operating system 130. Thus, the process avoids the previous backup of unknown data to the flash memory 126 to overwrite desired data stored in the flash memory 126 of the NVDIMM 120.

Figure 4:
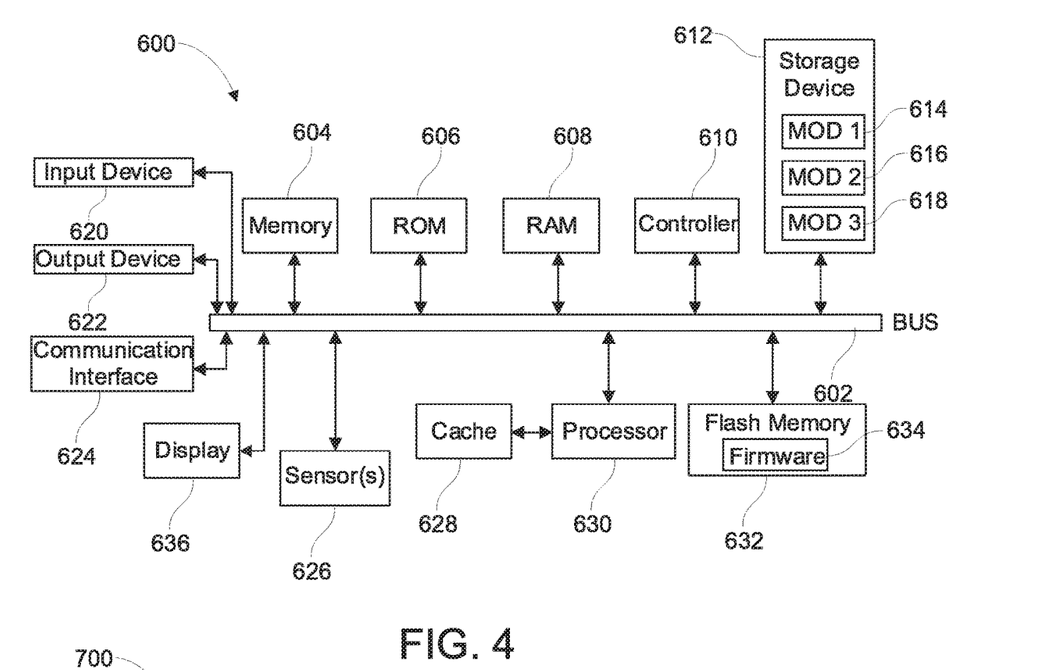
FIGS. 4 and 5 illustrate exemplary systems in accordance with various examples of the present disclosure.

FIG. 4 illustrates an example computing system 600, in which the components of the computing system are in electrical communication with each other using a system bus 602. The system 600 includes a processing unit (CPU or processor) 630; and the system bus 602 that couples various system components, including the system memory 604 (e.g., read only memory (ROM) 606 and random access memory (RAM) 608), to the processor 630. The system 600 can include a cache of high-speed memory connected directly with, in close proximity to, or integrated as part of the processor 630. The system 600 can copy data from the memory 604 and/or the storage device 612 to the cache 628 for quick access by the processor 630. In this way, the cache can provide a performance boost for the processor 630 while waiting for data. These and other modules can control or be configured to control the processor 630 to perform various actions. Other system memory 604 may be available for use as well. The memory 604 can include multiple different types of memory with different performance characteristics. The processor 630 can include any general purpose processor and a hardware module or software module, such as module 1 614, module 2 616, and module 3 618 embedded in the storage device 612. The hardware module or software module is configured to control the processor 630, as well as a special-purpose processor where software instructions are incorporated into the actual processor design. The processor 630 may essentially be a completely self-contained computing system, containing multiple cores or processors, a bus, memory controller, cache, etc. A multi-core processor may be symmetric or asymmetric.

To enable user interaction with the computing system 600, an input device 620 is provided as an input mechanism. The input device 620 can comprise a microphone for speech, a touch-sensitive screen for gesture or graphical input, keyboard, mouse, motion input, and so forth. In some instances, multimodal systems can enable a user to provide multiple types of input to communicate with the computing system 600. In this example, an output device 622 is also provided. The communications interface 624 can govern and manage the user input and system output.

The storage device 612 can be a non-volatile memory to store data that are accessible by a computer. The storage device 612 can be magnetic cassettes, flash memory cards, solid state memory devices, digital versatile disks, cartridges, random access memories (RAMs) 608, read only memory (ROM) 606, and hybrids thereof.

The controller 610 can be a specialized microcontroller or processor on the system 600, such as a BMC (baseboard management controller). In some cases, the controller 610 can be part of an Intelligent Platform Management Interface (IPMI). Moreover, in some cases, the controller 610 can be embedded on a motherboard or main circuit board of the system 600. The controller 610 can manage the interface between system management software and platform hardware. The controller 610 can also communicate with various system devices and components (internal and/or external), such as controllers or peripheral components, as further described below.

The controller 610 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 610 can also include a system event log controller and/or storage for managing and maintaining events, alerts, and notifications received by the controller 610. For example, the controller 610 or a system event log controller can receive alerts or notifications from one or more devices and components, and maintain the alerts or notifications in a system event log storage component.

Flash memory 632 can be an electronic non-volatile computer storage medium or chip that can be used by the system 600 for storage and/or data transfer. The flash memory 632 can be electrically erased and/or reprogrammed. The flash memory 632 can include EPROM (erasable programmable read-only memory), EEPROM (electrically erasable programmable read-only memory), ROM, NVRAM, or CMOS (complementary metal-oxide semiconductor), for example. The flash memory 632 can store a firmware 634 executed by the system 600 when the system 600 is first powered on, along with a set of configurations specified for the firmware 634. The flash memory 632 can also store configurations used by the firmware 634.

The firmware 634 can include a Basic Input/Output System or equivalents, such as an EFI (Extensible Firmware Interface) or UEFI (Unified Extensible Firmware Interface). The firmware 634 can be loaded and executed as a sequence program each time the system 600 is started. The firmware 634 can recognize, initialize, and test hardware present in the system 600 based on the set of configurations. The firmware 634 can perform a self-test, such as a POST (Power-On-Self-Test), on the system 600. This self-test can test the functionality of various hardware components such as hard disk drives, optical reading devices, cooling devices, memory modules, expansion cards, and the like. The firmware 634 can address and allocate an area in the memory 604, ROM 606, RAM 608, and/or storage device 612, to store an operating system (OS). The firmware 634 can load a boot loader and/or OS, and give control of the system 600 to the OS.

The firmware 634 of the computing system 600 can include a firmware configuration that defines how the firmware 634 controls various hardware components in the system 600. The firmware configuration can determine the order in which the various hardware components in the system 600 are started. The firmware 634 can provide an interface, such as an UEFI, that allows a variety of different parameters to be set, which can be different from parameters in a firmware default configuration. For example, a user (e.g., an administrator) can use the firmware 634 to specify clock and bus speeds; define what peripherals are attached to the system 600; set monitoring of health (e.g., fan speeds and CPU temperature limits); and/or provide a variety of other parameters that affect overall performance and power usage of the system 600. While firmware 634 is illustrated as being stored in the flash memory 632, one of ordinary skill in the art will readily recognize that the firmware 634 can be stored in other memory components, such as memory 604 or ROM 606.

The computing system 600 can include one or more sensors 626. The one or more sensors 626 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 626 can communicate with the processor, cache 628, flash memory 632, communications interface 624, memory 604, ROM 606, RAM 608, controller 610, and storage device 612, via the bus 602, for example. The one or more sensors 626 can also communicate with other components in the system via one or more different means, such as inter-integrated circuit (I2C), general purpose output (GPO), and the like. Different types of sensors (e.g., sensors 626) on the system 600 can also report to the controller 610 on parameters, such as cooling fan speeds, power status, operating system (OS) status, hardware status, and so forth. A display 636 may be used by the system 600 to provide graphics related to the applications that are executed by the controller 610.

Figure 5:
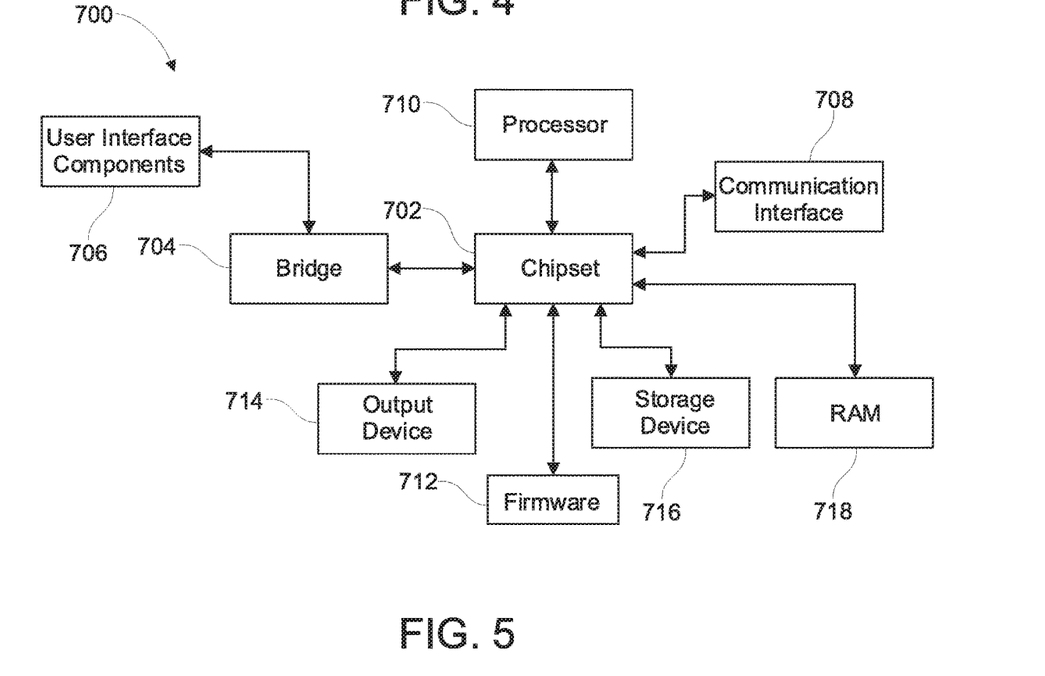

FIG. 5 illustrates an example computer system 700 having a chipset architecture that can be used in executing the described method(s) or operations, and generating and displaying a graphical user interface (GUI). The computer system 700 can include computer hardware, software, and firmware that can be used to implement the disclosed technology. System 700 can include a processor 710, representative of a variety of physically and/or logically distinct resources capable of executing software, firmware, and hardware configured to perform identified computations. The processor 710 can communicate with a chipset 702 that can control input to and output from the processor 710. In this example, chipset 702 outputs information to output device 714, such as a display, and can read and write information to storage device 716. The storage device 716 can include magnetic media, and solid state media, for example. Chipset 702 can also read data from and write data to RAM 718. A bridge 704 for interfacing with a variety of user interface components 706, can be provided for interfacing with chipset 702. User interface components 706 can include a keyboard, a microphone, touch detection and processing circuitry, and a pointing device, such as a mouse.

The chipset 702 can also interface with one or more communication interfaces 708 that can have different physical interfaces. Such communication interfaces can include interfaces for wired and wireless local area networks, for broadband wireless networks, and for personal area networks. Further, the machine can receive inputs from a user via user interface components 706, and execute appropriate functions, such as browsing functions by interpreting these inputs using the processor 710.

Moreover, chipset 702 can also communicate with firmware 712, which can be executed by the computer system 700 when powering on. The firmware 712 can recognize, initialize, and test hardware present in the computer system 700 based on a set of firmware configurations. The firmware 712 can perform a self-test, such as a POST, on the system 700. The self-test can test the functionality of the various hardware components 702-718. The firmware 712 can address and allocate an area in the RAM 718 to store an OS. The firmware 712 can load a boot loader and/or OS, and give control of the system 700 to the OS. In some cases, the firmware 712 can communicate with the hardware components 702-710 and 714-718. Here, the firmware 712 can communicate with the hardware components 702-710 and 714-718 through the chipset 702, and/or through one or more other components. In some cases, the firmware 712 can communicate directly with the hardware components 702-710 and 714-718.

It can be appreciated that example systems 600 (in FIG. 4) and 700 can have more than one processor (e.g., 630, 710), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for protecting desired data in a non-volatile dual in line memory module (NVDIMM), the system comprising:
a basic input output system (BIOS);
a non-volatile dual in line memory module (NVDIMM) coupled to a memory bus, the NVDIMM including a non-persistent memory and a persistent memory; and
a processor coupled to the memory bus, wherein when an update is applied to the basic input output system, desired data stored in the persistent memory of the NVDIMM is protected by disabling a NVDIMM backup function after a first power cycle immediately after the BIOS update, and wherein the NVDIMM backup function is enabled to restore the desired data to the non-persistent memory of NVDIMM from persistent memory after a second power cycle after the BIOS update.

2. The system of claim 1, further comprising another persistent memory storing a value indicating whether to enable the NVDIMM backup function.

3. The system of claim 2, wherein the another persistent memory is a CMOS register having an independent power source, wherein the CMOS register includes a register offset address to store the value.

4. The system of claim 1, wherein the backup function is performed prior to booting an operating system for the processor.

5. The system of claim 1, wherein the persistent memory is a flash memory on the NVDIMM.

6. The system of claim 1, wherein the non-persistent memory is a DRAM on the NVDIMM.

7. A method of protecting desired data in a non-volatile in line memory module (NVDIMM) in a computer system, the method comprising:
installing an update to the computer system;
copying desired data in a non-persistent memory of the NVDIMM to a persistent memory of the NVDIMM;
disabling the backup function of the NVDIMM during a first power cycle immediately after the update;
repowering the computer system after setting a related change to the update of the computer system;
enabling the backup function of the NVDIMM;
performing a power on self-test routine; and
restoring the backup desired data from the persistent memory to the non-persistent memory of the NVDIMM.

8. The method of claim 7, wherein the update is an update to a basic input output system (BIOS) of the computer system.

9. The method of claim 7, wherein enabling the backup function includes storing a value in another persistent memory indicating whether to enable the NVDIMM backup function.

10. The method of claim 9, wherein the another persistent memory is a CMOS register having an independent power source.

11. The method of claim 7, wherein the backup function is performed prior to booting an operating system for the processor.

12. The method of claim 7, wherein the persistent memory is a flash memory on the NVDIMM.

13. The method of claim 7, wherein the non-persistent memory is a DRAM on the NVDIMM.

14. A system that protects desired data in a non-volatile dual in line memory module (NVDIMM), the system comprising:
a non-volatile dual in line memory module (NVDIMM) coupled to a memory bus, the NVDIMM including a non-persistent memory and a persistent memory; and
a processor coupled to the memory bus, wherein when an update is applied to the system that requires a power cycle, desired data stored in the persistent memory of the NVDIMM is protected by disabling a NVDIMM backup function after a first power cycle immediately after the update, and wherein the NVDIMM backup function is enabled to restore the desired data to the non-persistent memory of NVDIMM from persistent memory after a second power cycle after the update.

15. The system of claim 14, further comprising another persistent memory storing a value indicating whether to enable the NVDIMM backup function.

16. The system of claim 15, wherein the another persistent memory is a CMOS register having an independent power source, wherein the CMOS register includes a register offset address to store the value.

17. The system of claim 14, wherein the backup function is performed prior to booting an operating system for the processor.

18. The system of claim 14, wherein the persistent memory is a flash memory on the NVDIMM.

19. The system of claim 14, wherein the non-persistent memory is a DRAM on the NVDIMM.

\* \* \* \* \*